UNITED STATES PATENT OFFICE.

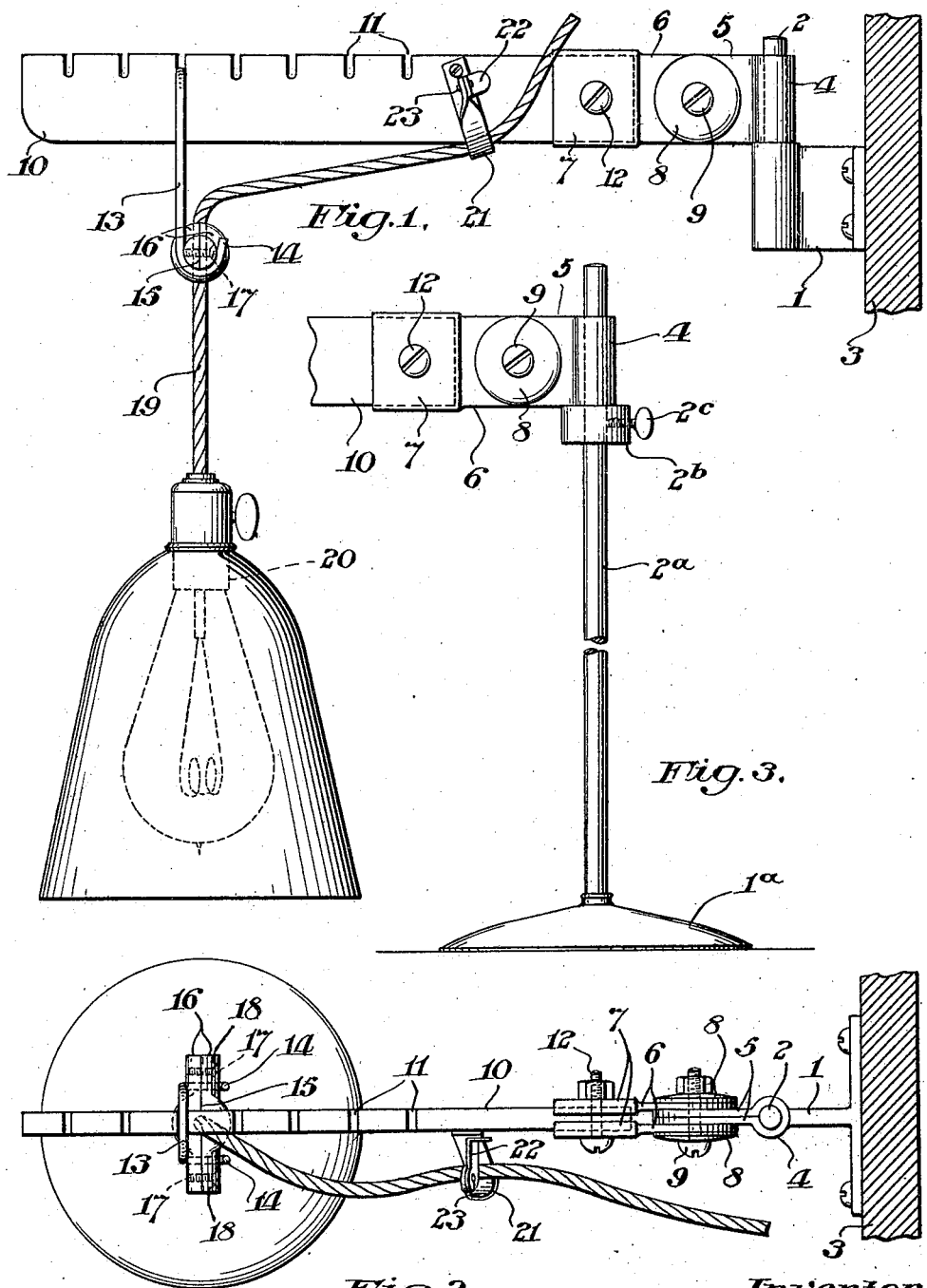

WILLIAM LOREY, OF PHILADELPHIA, PENNSYLVANIA.

ADJUSTABLE LAMP-SUPPORT.

1,395,847. Specification of Letters Patent. Patented Nov. 1, 1921.

Application filed May 25, 1920. Serial No. 384,193.

*To all whom it may concern:*

Be it known that I, WILLIAM LOREY, a citizen of the United States, residing in the city of Philadelphia, county of Philadelphia, and State of Pennsylvania, have invented certain new and useful Improvements in Adjustable Lamp-Supports, of which the following is a specification.

This invention is designed especially for supporting an electric lamp so that it can be adjusted in position universally by simple, inexpensive, convenient and efficient means. It is characterized by an arm adapted to be adjusted universally in combination with a hanger adapted to be held securely in adjustable relation to said arm and a clamp having a journaled connection with said hanger and by which the lamp conductors are engaged in adjustable relation and the lamp suspended.

In the accompanying drawings, Figure 1 is a sectional elevation of apparatus illustrating my invention in use; Fig. 2 is a sectional plan view of the construction illustrated in Fig. 1; and Fig. 3 is a broken elevation illustrating a modification in the details of the construction.

As illustrated in Figs. 1 and 2, a bracket or hinge member 1 provided with a vertical pintle 2 is secured to a supporting member 3, as a wall, post or the like.

A hinge member 4 is sleeved on the pintle 2 so that it rests upon the body of the member 1 and is provided with the extensions or wings 5 engaged in laminated relation, this member being conveniently formed of sheet metal pressed to shape.

Bearings 6, shown as plates provided with the seats 7, are engaged to the outer faces of the wings 5 by washers 8 and a bolt 9 passing through the parts 5, 6 and 8, the bolt being adjusted to provide the desired friction for permitting the parts 6 to be adjusted vertically and held in the adjusted position.

An arm 10 provided with the notches 11 has an end thereof engaged between the seats 7 suitably recessed therefor, the seats being securely clamped upon the arm by the bolt 12 passing therethrough. A bifurcated hanger or clevis 13 is engaged adjustably on the arm 10 by the entry of its top in the desired notch 11, the depending bifurcations of the hanger being bent back in a curve to provide bearings 14.

A clamp 15, comprising the sections 16 secured together by screws 17, has the end trunnions 18 which are journaled in the bearings 14, from which they are freely movable. The conductors 19, twisted together in the form of the usual lamp cord, are frictionally engaged between the parts 16 of the clamp 15 which normally grips the cord to support the lamp 20 depending therefrom, the cord being adjustable through the clamp as by relaxing a screw 17. A bracket or hook 21 is secured to the arm 10 and supports the cord 19, which is held therein by a keeper 22 having a hinged connection 23 therewith so that such keeper can be opened to permit the removal of the cord from the bracket 21 and can be closed to retain the cord in the bracket.

It will be seen that the arm 10, with the hanger 13, clamp 15, the depending cord section 19 and the lamp 20 suspended thereby, can be moved laterally about the vertical arbor provided by the pintle 2 and vertically in transverse relation to the lateral movement about the horizontal arbor provided by the bolt or pivot 9, while the hanger 13 with the depending parts can be suspended at various distances from the axes about which the arm is movable. The capacity of the hanger 13 for rocking relatively to the arm 10 and of the clamp 15 for rocking relatively to the hanger 13 provides for the automatic adjustment of the lamp and a flexible support therefor, permitting it to be moved by hand for the purpose of throwing the light in any desired direction.

As illustrated in Fig. 3, a stand $1^a$ is provided with a post $2^a$ on which is an adjustable bearing or collar $2^b$ adapted to be fixed in the desired vertical position on the post by a set screw $2^c$.

The hinge member 4 with its connected parts 6 and 10 is engaged on the top of the post where it is held at the desired elevation by the bearing $2^b$, the stand being movable from place to place.

Having described my invention, I claim:

1. A lamp support comprising an arm having transverse axes about which it is adjustable, a hanger adapted to be supported by said arm in adjustable relation thereto, said hanger having bearings, and a clamp having trunnions journaled in said bearings, said clamp adapted for engaging a lamp cord and supporting a lamp depending therefrom.

2. A lamp support comprising a vertical arbor, a hinge member adapted to turn on said arbor, an arm, means comprising a horizontal arbor for engaging said arm in vertically adjustable relation to said hinge member, a bifurcated hanger connected in adjustable relation with said arm, said hanger having open bearings provided at its lower bifurcated ends, and a clamp having trunnions adapted to turn in said bearings, said clamp comprising sections adapted for engaging a lamp cord.

Signed at Philadelphia, in the county of Philadelphia and State of Pennsylvania, this 22nd day of May, 1920.

WILLIAM LOREY.